United States Patent [19]

Fritsch et al.

[11] Patent Number: 4,851,945
[45] Date of Patent: Jul. 25, 1989

[54] DEMAGNETIZING DEVICE HAVING AN OSCILLATING PERMANENT MAGNET

[75] Inventors: Joseph F. Fritsch; Roxanne Y. Fritsch, both of 114 Lansdowne Park, Dublin 4, Ireland; Francois Malgat, Paris, France

[73] Assignees: Joseph F. Fritsch; Roxanne Y. Fritsch, both of Dublin, Ireland

[21] Appl. No.: 106,283

[22] Filed: Oct. 9, 1987

[30] Foreign Application Priority Data

Oct. 10, 1986 [IE] Ireland .................................. 2669/86

[51] Int. Cl.⁴ .............................................. G11B 5/46
[52] U.S. Cl. .................................................... 360/128
[58] Field of Search ........................................ 360/128

[56] References Cited

U.S. PATENT DOCUMENTS

| | | | |
|---|---|---|---|
| 3,647,990 | 3/1972 | Eul, Jr. et al. | 360/128 |
| 3,655,924 | 4/1972 | Puskas | 360/128 |
| 3,810,230 | 5/1974 | Orlowski et al. | 360/128 |
| 3,958,273 | 5/1976 | Alexandrovich, Sr. | 360/128 |
| 4,135,219 | 1/1979 | Yoshizawa et al. | 360/128 |
| 4,158,871 | 6/1979 | Leaming | 360/137 |
| 4,378,582 | 3/1983 | Maier et al. | 360/128 X |
| 4,586,099 | 4/1986 | Suzuki et al. | 360/128 |
| 4,594,629 | 6/1986 | d'Arc | 360/128 |
| 4,713,712 | 12/1987 | Chou | 360/128 |

FOREIGN PATENT DOCUMENTS

| | | | |
|---|---|---|---|
| 0193367 | 9/1986 | European Pat. Off. | 360/128 |
| 55-4709 | 1/1980 | Japan | 360/128 |
| 2045004 | 10/1980 | United Kingdom . | |

Primary Examiner—John H. Wolff
Attorney, Agent, or Firm—Sughrue, Mion, Zinn, Macpeak & Seas

[57] ABSTRACT

A demagnetizing device for demagnetizing a sound head in a cassette tape recorder, comprises a cassette type housing. A carrier member pivotal in the housing carries a permanent magnet which oscillates with the carrier member sidewardly across an opening in the housing adjacent the sound head of the cassette tape recorder to demagnetize the sound head. A cam driven by a spindle of the cassette tape recorder acting on a follower drives the carrier member with oscillating movement.

18 Claims, 5 Drawing Sheets

FIG. 6

DEMAGNETIZING DEVICE HAVING AN OSCILLATING PERMANENT MAGNET

BACKGROUND OF THE INVENTION

1. Field of the Invention

The present invention relates to a demagnetizing device, and in particular to a demagnetizing device for audio, video, data or other magnetic recording and/or playback apparatus for demagnetizing a component in the apparatus, such as, for example, a sound head, a video head, an erase head, rollers or the like. Needless to say, however, the device is not limited to such use.

2. Discussion of the Prior Art

In audio and video recording and/or playback apparatus, such as, for example, apparatus of the type which is suitable for recording and/or playing back from a magnetic tape, it is usual to provide the magnetic tape in a cassette type housing. Such apparatus, in general, comprise a cassette receiving area into which the tape cassette is mounted for playing or recording. A sound head, a video head, an erase head, rollers for tape to pass over and the like are mounted either in or adjacent the cassette receiving area. Through normal use, magnetic charges tend to build up on these components in or adjacent the cassette receiving area, and in general, the build-up of such magnetic charges considerably reduces the quality of sound or vision reproduction. It has been found, in particular, that the build-up of a magnetic charge on the sound head can cause considerable reduction in the quality of sound reproduction.

Unfortunately, there is no known device which is capable of effectively and at the same time simply removing a magnetic charge from any of the components in or adjacent the cassette receiving area of such apparatus.

One such prior art device for demagnetizing the sound in a cassette tape recorder/playback apparatus comprises a cassette type housing engagable with the cassette receiving area of the cassette tape recorder player. A magnet is rotatably mounted in the housing, and is driven, in use, by the drive spindle of the apparatus being demagnetized. The magnet is arranged to rotate in front of the sound head, and is mounted on a rotatable shaft with the poles of the magnet extending radially outwardly on opposite sides of the shaft. Accordingly, as the shaft rotates the magnet, the sound head is alternatively subjected to the fields of the north and south poles of the magnet. It has been found that this device does not adequately demagnetize the sound head. It is not known precisely why this device fails, however, it is thought that by virtue of the fact that the sound head is alternatively subjected to north and south fields, demagnetization is prevented.

There is therefore a need for a demagnetizing device which overcomes these problems.

OBJECTS OF THE INVENTION

One object of the invention is to provide a demagnetizing device for audio, video, data or other magnetic recording and/or playback apparatus, for demagnetizing a component in the apparatus. Another object of the invention is to provide a demagnetizing device which overcomes the problems of known demagnetizing devices. Another object of the invention is to provide a demagnetizing device which is suitable for demagnetizing one or more components in the cassette receiving area of a cassette type recorder/playback apparatus. A further object of the invention is to provide a demagnetizing device suitable for demagnetizing one or more of the components in an audio/playback device, and in particular, a cassette type audio recorder/playback apparatus. A still further object of the invention is to provide a demagnetizing device which, as well as demagnetizing one or more of the components, also simultaneously cleans one or more of the components in the apparatus.

It is also an object of the invention to provide a demagnetizing device which is relatively easily manufactured and assembled, and which is relatively inexpensive. A still further object of the invention is to provide a demagnetizing device which is relatively simple and easy to use.

SUMMARY OF THE INVENTION

According to the invention, there is provided a demagnetizing device for audio, video, data and other magnetic recording and/or playback apparatus, for demagnetizing a component in the apparatus, the device comprising a housing for engagement in the apparatus, demagnetizing means, and mounting means for mounting the demagnetizing means in the housing with oscillating movement so that, in use, the demagnetizing means is movable relative to the component to be demagnetized.

In one embodiment of the invention, the demagnetizing means is mounted in the housing to, in use, be adjacent the component to be demagnetized.

In another embodiment of the invention, the mounting means is a carrier member, the carrier member being pivotally mounted in the housing.

Preferably, the demagnetizing means is a magnetic means and one pole of the magnetic means is, in use, directed towards the component to be demagnetized and the other pole is directed away from the component. Advantageously, the magnetic means is a permanent magnet.

In a further embodiment of the invention, the demagnetizing means is movable by drive transmission means in the housing.

In a further embodiment of the invention, a cleaning means is mounted adjacent the demagnetizing means to clean the component being demagnetized.

ADVANTAGES OF THE INVENTION

The advantages of the invention are many, however, one important advantage of the invention is that it has been found that the device adequately demagnetizes the components which are to be demagnetized. In particular, it has been found that where the demagnetizing device is used to demagnetize the sound head of a cassette tape recorder/playback apparatus the device has been found to be particularly effective in demagnetizing the sound head.

Another advantage of the invention is that by virtue of the construction of the device, it is relatively easy and simple to use. Furthermore, because of the construction of the device of the invention, it can be produced relatively inexpensively, and also can be manufactured and assembled relatively easily.

A further important advantage of the invention is that when the device is provided with a cleaning means as well as a demagnetizing means, the component or components being demagnetized are simultaneously cleaned. This has a particular advantage in that it considerably saves time and effort in demagnetizing and cleaning of such apparatus.

These and other objects and advantages of the invention will be readily apparent to those skilled in the art from the following description of some preferred embodiments thereof, given by way of example only, with reference to the accompanying drawings.

DETAILED DESCRIPTION OF THE INVENTION

Figure 1:
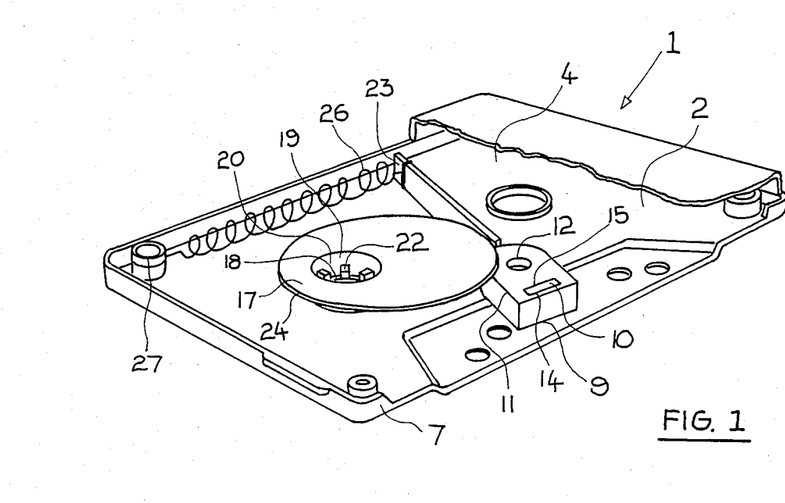
FIG. 1 is a perspective view of a demagnetizing device according to the invention.
Figure 2:
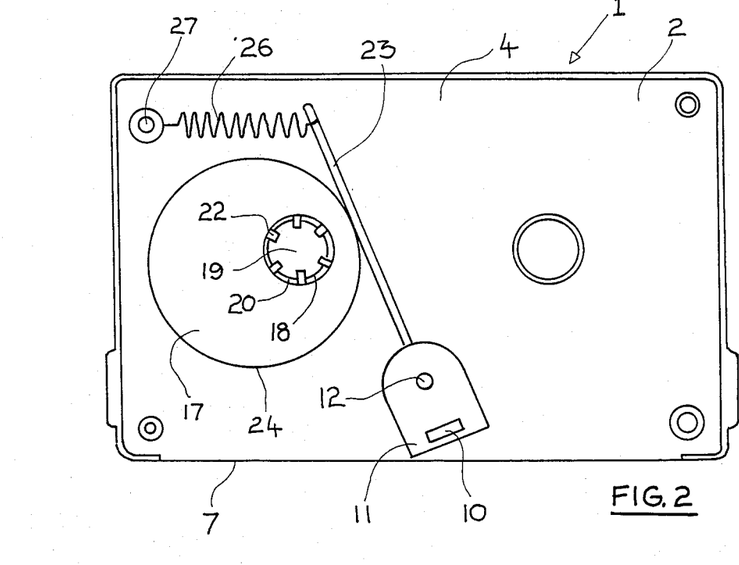
FIG. 2 is a plan view of the device of FIG. 1.

Referring to the drawings, and initially to FIGS. 1 and 2 a demagnetizing device according to the invention in its simplest form is illustrated and indicated generally by the reference numeral 1. In this case, the device 1 is for demagnetizing the sound head in an audio cassette type recorder/playback apparatus. Such audio recorder/playback apparatus are generally referred to as cassette tape recorders. The cassette tape recorder is not illustrated, however, such cassette tape recorders will be well known to those skilled in the art, and briefly, they comprise a cassette receiving area for receiving the cassette tape. A sound head is mounted adjacent and extends into the cassette receiving area to record onto or to transcribe from the tape. A pair of spindles extend into the cassette receiving area for engaging reels within the cassette housing onto which the tape is wound. One spindle is a drive spindle which engages the take up reel, while the other spindle is an idling spindle which engages the reel from which the tape is being unwound. In certain cassette tape recorders, the function of the spindles can be interchanged.

The device 1 comprises a cassette housing 2 of injection moulded plastics material formed in two halves 4. The housing 2 is substantially similar to a cassette tape housing and is suitable for engagement in the cassette receiving area of the cassette tape recorder. A front face 7 is provided with an opening 9 which, in use, is adjacent the sound head of the cassette tape recorder. Demagnetizing means, in this case a permanent magnet 10, is mounted on mounting means, namely a carrier member 11 which is pivotally mounted at 12 in the housing 2. The permanent magnet, in this case, is of relatively flat thin construction and one pole is provided on a face 14 and the other on a face 15. The face 14 faces the magnetic sound head, in use, through the opening 9.

Drive transmission means, in this case a cam 17, is rotatably mounted in the housing 2. A pair of rings 18 around openings 19 in the halves 4 of the housing 2 rotatably engage an eccentric bore 20 in the cam 17. The bore 20 extends through the cam 17 and engages, in use, the drive spindle in the cassette receiving area of the cassette tape recorder. Teeth 22 extending inwardly into the bore 20 engage corresponding splines on the drive spindle. A cam follower 23 extending from the carrier member 11 engages the cam profile 24, and a spring 26 extending between the follower 23 and an anchor point 27 in the housing 2 urges the follower into continuous engagement with the cam 17. Thus, as the cam 17 is rotated by the drive spindle in the cassette receiving area, the carrier member 11 oscillates about its pivot pin 12, thereby causing the permanent magnet 10 to oscillate sidewardly across in front of the sound head. This oscillating action of the magnet, it has been found, demagnetizes the sound head. By virtue of the fact that a single pole of the permanent magnet 10 is arranged to face the sound head, particularly effective demagnetizing is achieved. In this case, the carrier member, cam follower and cam are all of injection moulded plastics material.

In use, the device 1 is inserted in the cassette receiving area of the cassette tape recorder to be cleaned, with the bore 20 of the cam 17 engaging the drive spindle of the tape cassette and the magnet 10 and carrier 11 adjacent the sound head. The tape recorder is switched on in the usual way, and the spindle drives the cam 17. This, in turn, causes the carrier member 11 to oscillate, and in turn the magnet 10. The oscillating action of the magnet 10 sidewardly across the front of the sound head demagnetizes the sound head.

Referring now to FIGS. 3 to 11 there is illustrated a demagnetizing device indicated generally by the reference numeral 30 according to a preferred embodiment of the invention. In this case, the device 30, as well as demagnetizing the sound head of a cassette tape recorder, also cleans the sound head and other components adjacent the sound head. The device 30 comprises a housing 31 of injection moulded plastics material formed in two halves 32, joined by snap action fasteners 33 integrally injection moulded with the halves 32. A face 34 of the housing 31 is provided with an opening 35 which communicates in use with the sound head and other components to be cleaned.

A mounting means, namely a carrier member 36 of injection moulded plastics material is pivotal on a pivot pin 37 in the housing 31. A pair of resilient engaging members 38 extending within the carrier member 36 engage the pivot pin 37 with releasable snap-on engagement to facilitate removing the carrier member as will be described below, see FIGS. 4, 8 and 9. Cleaning means provided by a brush 39 comprising bristles 40 and a base 41 for cleaning the sound head is releasably engagable in a receiver portion 42 in the carrier member 36. Demagnetizing means, namely, magnetic means, in this case provided by a permanent magnet 43 is mounted in a recess 44 behind the receiver portion 42 of the carrier member 36. In this case, the permanent magnet is of cobalt-rare earth material and is of thin flat construction, having one pole on its face 45 and the other pole on its face 46. The face 45 faces the sound head in use.

Figure 8:
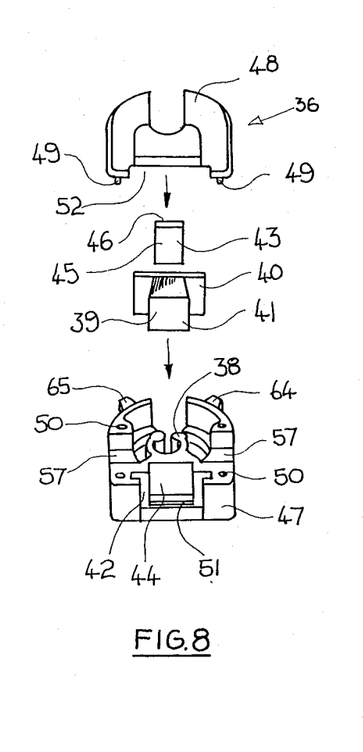
FIG. 8 is an exploded perspective view of a detail of the device of FIG. 3.
Figure 9:
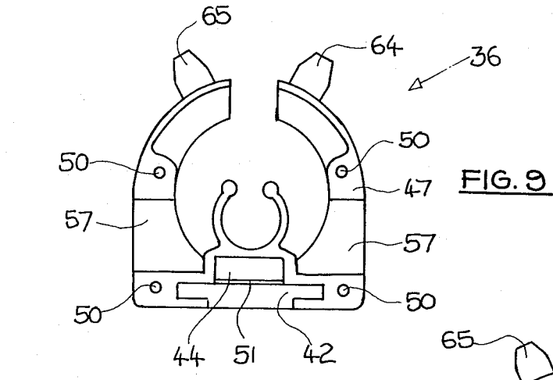
FIG. 9 is a plan view of portion of the detail of FIG. 8.
Figure 10:
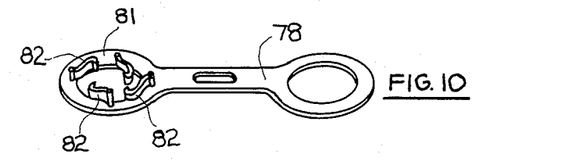
FIG. 10 is a perspective view of another detail of the device of FIG. 3.

Referring to FIGS. 8 and 9, the carrier member 36 is formed in two parts, a main part 47 and a cover part 48, joined by snap action fasteners 49 and holes 50 integrally moulded respectively with the cover part 48 and main part 47. Strips 51 integrally moulded with the main part 47 and the cover part 48 retain the magnet 43 in the recess 44. The magnet 43 is placed in the recess 44 prior to assembly of the main and cover parts 47 and 48. A portion 52 is relieved in the cover part 48 to facilitate removal of the brush 39 from the receiver portion 42.

Figure 4:
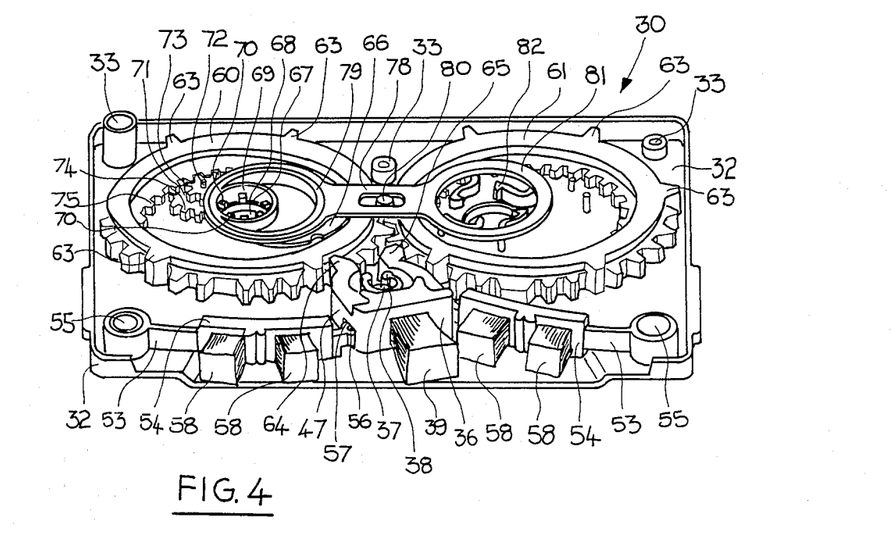
FIG. 4 is a perspective view of portion of the device of FIG. 3.
Figure 11:
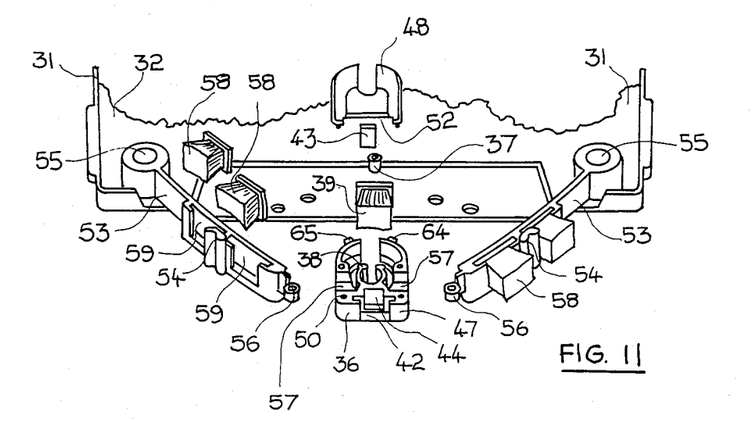
FIG. 11 is a perspective view of portion of the device of FIG. 3.

A pair of elongated side carrier members 54 also of injection moulded plastics material are pivotal on pivot pins 55 in the housing 31, see in particular FIGS. 4 and 11. Free ends 56 of circular cross section slidably and releasably engage corresponding recesses 57 in the carrier member 36. Thus, pivotal oscillating action of the carrier member 36 causes the side carrier members 54 to pivot inwardly and outwardly of the housing 31. Cleaning means provided by brushes 58 similar to the brush 39 releasably engage receiver portions 59 in the side carrier members 54 for cleaning components adjacent the sound head. Accordingly, as the side carrier members 54 pivot inwardly and outwardly, the brushes 58 are urged through the opening 36 into engagement with the components to be cleaned to effect cleaning. A portion 53 of each side carrier member 54 is weakened to provide a certain amount of flexibility of the carrier members 54, which further improves the cleaning action of the brushes 52.

Figure 5:
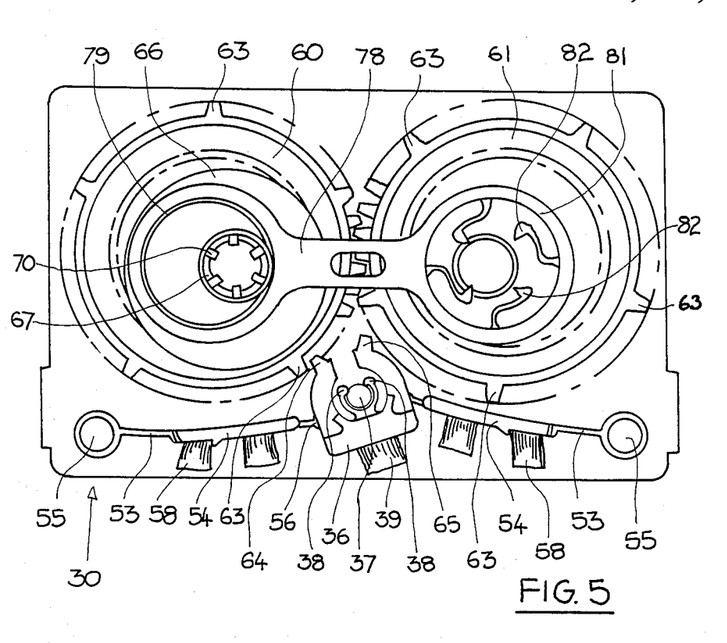
FIG. 5 is a plan view of the device of FIG. 3.
Figure 6:
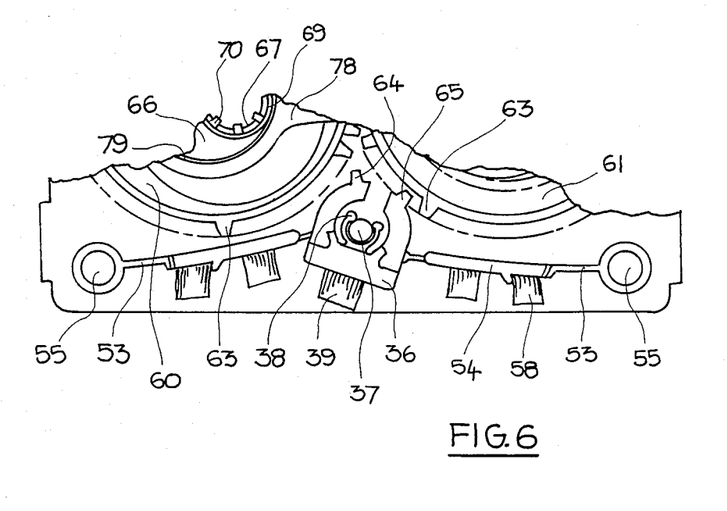
FIG. 6 is a plan view of portion of the device of FIG. 3.

The carrier member 36 and in turn the side carrier members 54 are driven by drive transmission means which in this case is provided by a pair of intermeshing gears 60 and 61, one of which, 60, is driven through a gear train which will be described below by the drive spindle in the cassette receiving area of the cassette tape recorder. The intermeshing gears 60 and 61 are of injection moulded plastics material and are rotatably mounted in the housing 31 or rings 62 on the housing 31. Spaced apart intermittent teeth 63 are provided around the periphery of the gears 60 and 61 which intermittently alternately strike members 64 and 65 extending from the carrier member 36 to cause the carrier member to oscillate about the pivot pin 37. In FIG. 5, the carrier member 36 is illustrated at one end of its stroke, and is just about to be moved in the opposite direction by an intermittent tooth 63 on the gear 60 engaging the members 64. FIG. 6 illustrates the member 65 being moved in the opposite direction by the tooth 63 on the gear 61. Accordingly, as the intermeshing gears 60 and 61 rotate, the carrier member 36 is caused to oscillate. This, in turn, causes the brush 39 to oscillate backwards and forwards across the sound head, thereby cleaning it. At the same time, the permanent magnet 43 is also oscillated backwards and forwards across the sound head, thereby demagnetizing the sound head.

Figure 7:
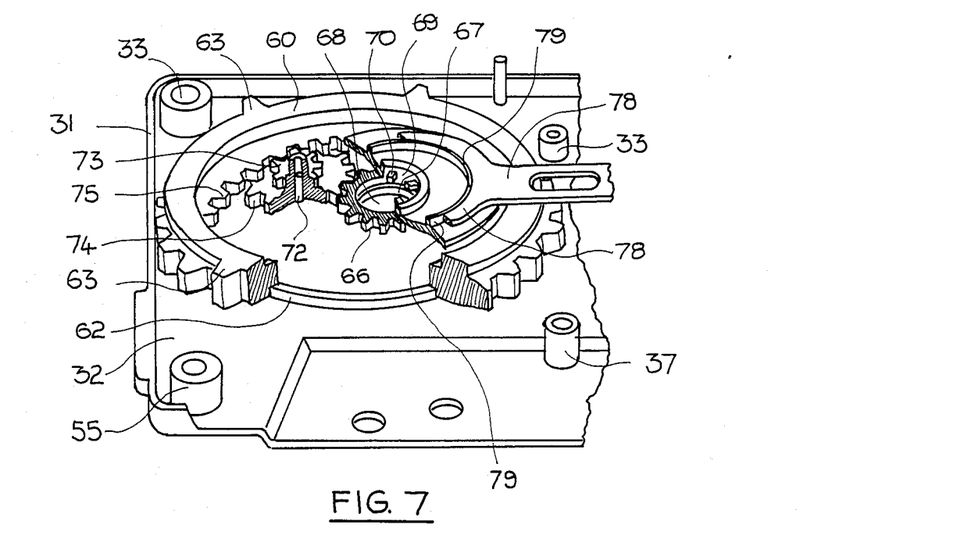
FIG. 7 is a cut-away perspective view of portion of the device of FIG. 3.

The gear train which drives the intermeshing gears 60 and 61 comprises a drive gear 66 of injection moulded plastics material rotatable on rings 67 around openings 68 in the housing 31, see FIGS. 4 and 7. A bore 69 extends through the drive gear 66 to engage the drive spindle of the cassette tape recorder. Teeth 70 extending inwardly into the bore 69 engage corresponding splines on the drive spindle. The drive gear 66 drives an intermediate gear 71 also of injection moulded plastics material rotatable on a pin 72 in the housing 31. Gear teeth 73 on the gear 71 engage the drive gear 66, while gear teeth 74 on the intermediate gear 71 engage inwardly directed gear teeth 75 on the intermeshing gear 60 to drive the gear 60.

A reciprocating member 78 is driven by an eccentric drive ring 79 on the drive gear 66. The reciprocating member 78 reciprocates on a pin 80 in the housing 31. A ring member 81 on the end of the reciprocating member 78 intermittently drives the idling spindle of the cassette tape recorder. This is necessary in certain types of cassette tape recorders to avoid the drive spindle being cut out by control apparatus on sensing no movement of the idling spindle. A plurality of flexible members 82 extend inwardly from the ring member 81 to engage splines on the idling spindle and as the member 78 reciprocates, the flexible members 82 sequentially engage the idling spindle, thereby intermittently rotating it.

Figure 3:
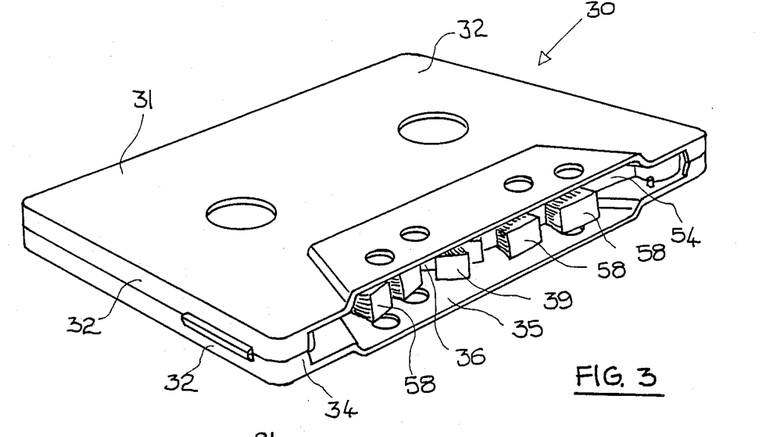
FIG. 3 is a perspective view of a demagnetizing device according to another embodiment of the invention.

In use, the device 30 is placed in the cassette receiving area of the cassette tape recorder to be cleaned, with the drive gear 66 engaging the drive spindle of the cassette tape recorder, and the brushes 39 and 58 adjacent the components to be cleaned. The tape recorder is then turned on, and the drive spindle in the cassette receiving area drives the drive gear 66. This, in turn, drives the intermeshing gears 60 and 61 through the intermediate gear 71. As the intermeshing gears 60 and 61 rotate, the intermittent teeth 63 intermittently and alternately engage the members 64 and 65 of the carrier member 36. This causes the carrier member 36 and in turn its brush 39 and permanent magnet 43 to oscillate backwards and forwards across the sound head. The brush 39 thereby cleans the sound head and the magnet 43 demagnetizes the head. Oscillating movement of the carrier member 36 also causes the side carrier members 54 to pivot inwardly and outwardly against the other components of the cassette receiving area to be cleaned, and on engagement by the brushes 58 are cleaned. When the components of the cassette tape recorder have been cleaned, and the sound head demagnetized the device 30 is ejected by using the eject mechanism of the cassette tape recorder. To enhance the cleaning action of the device, cleaning fluid may be applied to the cleaning brushes 39 and 58 prior to insertion of the device 30 in the cassette receiving area.

To remove or replace the brushes 39 and 58, the carrier member 36 is disengaged from the pivot pin 37 and pulled outwardly through the opening 35 in the housing 31 as illustrated in FIG. 11. Further outward movement of the carrier member 36 causes the free ends 56 of the side carrier members 54 to disengage the recesses 57 in the carrier member 36. Accordingly, the side carrier members 54 are pivoted outwardly through the opening 35 also as illustrated in FIG. 11. The brushes 39 and 58 are removed from their appropriate receiving portions 42 and 59, and replaced with fresh brushes or may be washed and replaced, or in certain cases not replaced at all. The side carrier members 54 are then pivoted inwardly towards the opening 35 to engage the carrier member 36 which is in turn moved inwardly and engaged on the pivot pin 37 with a snap-fit action.

Figure 12:
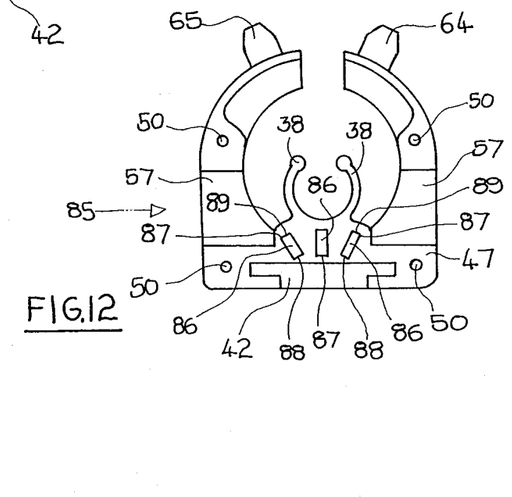
FIG. 12 is a plan view of a similar detail to that illustrated in FIG. 9 of portion of a device according to a still further embodiment of the invention.

Refferring now to FIG. 12 there is illustrated a carrier member 85 for use in a demagnetizing device (not shown) according to another embodiment of the invention. In this case, the demagnetizing device (not shown) is similar to the device 30, the only difference being in the carrier member. However, the carrier member 85 is substantially similar to the carrier member 36 of the device 30, and similar components of the carrier member 85 are identified by the same reference numerals used in the description of the previous embodiment of the invention. In this case, the carrier member 85 carries three permanent magnets 86 of cobalt-rare earth. These are releasably mounted in recessess 87. The magnets 86 are substantially radially arranged relative to the pivot pin. The magnets 86 are magnetized so that the poles of the magnets are at the ends 88 and 89. Operation of the carrier member 85 is similar to the carrier member 9. As the carrier member 85 oscillates sidewardly across the sound head, the magnets 86 demagnetize the sound head.

It will be appreciated that while a particular magnetic means has been described in the embodiments of the invention just described, any other suitable magnetic means could be provided. For example, in certain cases it is envisaged that the magnetic means may be provided by an electro-magnet. In another case it is envisaged that the permanent magnet may be of any material other than cobalt-rare earth material. Needless to say, the magnet or magnets may be arranged in any desired position on the carrier member. For example, in certain cases, it is envisaged that a single permanent magnet may be used, and this magnet may be radially mounted. In other words, the single magnet would be mounted in a somewhat similar fashion to the mounting arrangement of the centre member 86 of the carrier member 85. Indeed, it is also envisaged that a permanent magnet mounted in the configuration of the magnet 43 in the carrier 36 could be provided with its poles at either side, left to right, or top to bottom, instead of being provided on the flat faces. Further, it is envisaged that while the demagnetizing means has been described as being a magnetic means, any other suitable demagnetizing means could be used without departing from the scope of the invention.

It is also envisaged that any other suitable mounting means for the magnets could be used besides the carrier member illustrated. Indeed, any other carrier member could be used. Indeed, in certain cases, it is envisaged that the carrier member may be dispensed with altogether, and the magnet may be itself pivotally mounted directly to the housing.

Additionally, it is envisaged that instead of pivotally mounting the magnet, the magnet could be mounted in any other mounting arrangement, so that the magnet is movable relative to the housing, and in turn, in use, relative to the sound head or other component with oscillating movement. For example, the magnet could be mounted to be slidable in the housing, or to, for example, reciprocate towards and away from the sound head, or reciprocate transversely across the face of the sound head. Needless to say, any other suitable movable mounting arrangement could be used, and such mounting arrangements will be readily apparent to those skilled in the art. Further, the carrier member, instead of being pivotally mounted, may be mounted to slide or reciprocate in the housing, and in use, may be adapted to slide or reciprocate sidewardly across the sound head or towards and away from the sound head.

Furthermore, while the device has been described for demagnetizing a sound head of a tape recorder, it could be used for demagnetizing any component in the tape recorder, or any component in any other magnetic recording and/or playback apparatus. Where it is desired to demagnetize other components, it is envisaged that magnetic means, such as a permanent magnetic, electro-magnet or any other type of magnet could be mounted on the side carrier members.

Although needless to say, it will be appreciated that the magnets for demagnetizing the other components could be mounted on any other suitable carriers in the housing, or indeed could be directly mounted in the housing to oscillate.

Further, it will be appreciated that while a particular drive means and transmission means has been described for driving the carrier member, any other suitable drive means could be used. In fact, in certain cases, it is envisaged that the drive means may not be connected to the drive spindle of the tape recorder, but rather a manual arrangement could be provided whereby the carrier member and/or the magnet would be manually driven.

It is envisaged that while the device has been described for use in demagnetizing a tape recorder, it could be used for any other magnetic recording and/or playback apparatus, such as for example, a video playback unit, or a video recorder, or a video recorder/playback unit, or any other magnetic recording and/or playback apparatus.

Further, while the embodiment of the invention described with reference to FIGS. 3 to 11 has been described as comprising cleaning means as well as magnetic means, it will be appreciated that the device could be provided without the cleaning brushes, in which case it is envisaged that the side carrier members may or may not be dispensed with.

It will also, of course, be appreciated that in many cases the reciprocating member for intermittently driving the idling spindle of the cassette tape recorder could be dispensed with without departing from the scope of the invention.

Needless to say, any other construction of demagnetizing device could be used without departing from the scope of the invention. Indeed, in certain cases, any suitable form of housing besides a cassette type housing could be used. In fact, in certaind cases, it is envisaged that the housing may be provided as a framework. Needless to say where the device is to be provided for demagnetizing a video recorder playback unit, an appropriately shaped housing would be used. Needless to say, in certain cases, it is envisaged that even in the case of a demagnetizing device for demagnetizing a video recorder playback unit may merely comprise a housing in the form of a framework, or indeed any other suitable arrangement. Indeed, in certain cases, it is envisaged that a demagnetizing device may be provided in which the housing merely comprises a base member.

We claim:

1. A demagnetizing device for audio, video, data and other magnetic recording and/or playback apparatus, for demagnetizing a component in the apparatus, the device comprising:
   a housing for engagement in the apparatus,
   demagnetizing means,
   mounting means in the housing for mounting the demagnetizing means in the housing for oscillating movement from side to side in front of the component to be demagnetized, and
   drive transmission means in the housing for driving the demagnetizing means with the oscillating movement.

2. A demagnetizing device as claimed in claim 1 in which the demagnetizing means is mounted in the housing to, in use, be adjacent the component to be demagnetized.

3. A demagnetizing device as claimed in claim 1 in which the mounting means is a carrier member, the carrier member being pivotally mounted in the housing.

4. A demagnetizing device as claimed in claim 3 in which the demagnetizing means is releasably mounted in the carrier member.

5. A demagnetizing device as claimed in claim 1 in which the demagnetizing means is a magnetic means.

6. A demagnetizing device as claimed in claim 5 in which the magnetic means is a permanent magnet.

7. A demagnetizing device as claimed in claim 6 in which the magnet is of relatively flat thin construction, having one pole on one flat face and the other pole on the other flat face.

8. A demagnetizing device as claimed in claim 1 in which one pole of the magnetic means is, in use, directed towards the component to be demagnetized and the other pole is directed away from the component.

9. A demagnetizing device as claimed in claim 1 in which the drive transmission means comprises a pair of intermeshing gears, each comprising a plurality of spaced apart intermittent teeth alternately engagable with the mounting means to oscillate the mounting means.

10. A demagnetizing device as claimed in claim 1 in which the drive transmission means, in use, engages drive means within the apparatus being demagnetized for transmitting drive from the drive means to the mounting means.

11. A demagnetizing device as claimed in claim 10 in which the device is for use in a cassette tape type recording and/or playback apparatus, the device comprising a cassette type housing engagable, in use, in a cassette receiving area of the apparatus, and the drive transmission means being engagable with drive means in the cassette receiving area of the apparatus.

12. A demagnetizing device as claimed in claim 1 in which the demagnetizing means is positioned in the housing to, in use, demagnetize the sound head of the apparatus.

13. A demagnetizing device as claimed in claim 1 in which the demagnetizing means is mounted in the housing to, in use, demagnetize the erase head of the apparatus.

14. A demagnetizing device as claimed in claim 1 in which a cleaning means is mounted adjacent the demagnetizing means to clean the component being demagnetized.

15. A demagnetizing device as claimed in claim 14 in which the cleaning means is mounted in front of the demagnetizing means so that, in use, the cleaning means is between the demagnetizing means and the component to be demagnetized.

16. A demagnetizing device as claimed in claim 14 in which the cleaning means is provided by a brush member comprising a plurality of flexible bristles extending from a base member.

17. A demagnetizing device as claimed in claim 14 in which the cleaning means is releasably mounted.

18. A demagnetizing device as claimed in claim 1 in which the drive transmission means drives the demagnetizing means with intermittent movement so as to cause the demagnetizing means to pause between each movement, the drive transmission means being periodically disengaged from the demagnetizing means so as to effect the pause.

* * * * *